US012695239B2

(12) United States Patent
Lee

(10) Patent No.: US 12,695,239 B2
(45) Date of Patent: Jul. 28, 2026

(54) COMB STYLE CONNECTOR AND CONNECTING ASSEMBLY WITH THE SAME

(71) Applicant: Continental Automotive Technologies GmbH, Hannover (DE)

(72) Inventor: Wongyoung Lee, Seoul (KR)

(73) Assignee: AUMOVIO Germany GmbH, Frankfurt am Main (DE)

( * ) Notice: Subject to any disclaimer, the term of this patent is extended or adjusted under 35 U.S.C. 154(b) by 260 days.

(21) Appl. No.: 18/213,498

(22) Filed: Jun. 23, 2023

(65) Prior Publication Data

US 2024/0006805 A1 Jan. 4, 2024

(30) Foreign Application Priority Data

Jun. 29, 2022 (KR) ........................ 10-2022-0079538

(51) Int. Cl.
*H01R 13/62* (2006.01)

(52) U.S. Cl.
CPC .................................... *H01R 13/62* (2013.01)

(58) Field of Classification Search
None
See application file for complete search history.

(56) References Cited

U.S. PATENT DOCUMENTS

| | | | | |
|---|---|---|---|---|
| 6,312,288 | B1 | 11/2001 | Genz et al. | |
| 9,419,394 | B2 * | 8/2016 | Wildstone ................ | H02J 9/04 |
| 10,056,723 | B2 * | 8/2018 | Pal ......................... | B64D 47/00 |
| 10,534,142 | B2 | 1/2020 | Yang | |
| 2011/0117757 | A1 | 5/2011 | Seibold et al. | |
| 2012/0052734 | A1 | 3/2012 | Fukuda et al. | |
| 2019/0113693 | A1 | 4/2019 | Yang | |
| 2021/0194191 | A1 | 6/2021 | Mitter | |

FOREIGN PATENT DOCUMENTS

| | | | |
|---|---|---|---|
| EP | 2677605 | A1 | 12/2013 |
| JP | 2000307202 | A | 11/2000 |
| JP | 4399051 | B2 | 1/2010 |
| JP | 2015061420 | A | 3/2015 |
| KR | 20040038479 | A | 5/2004 |
| KR | 100791040 | B1 | 1/2008 |
| KR | 20170033720 | A | 3/2017 |
| KR | 20210082100 | A | 7/2021 |
| WO | 2018038161 | A1 | 8/2017 |

OTHER PUBLICATIONS

Office Action dated Jan. 26, 2024 from corresponding Korean patent application No. 10-2022-0079538.
Written Decision on Registration, dispatched on Aug. 19, 2024 from corresponding Korean patent application No. 10-2022-0079538.

* cited by examiner

*Primary Examiner* — Ross N Gushi

(57) ABSTRACT

Disclosed are a comb type connector and a connector assembly having the same. The disclosed comb type connector comprises: a base made of a conductive metal material; and a plurality of thin plate terminals made of a conductive metal material and which protrude in a thin film shape and are spaced apart from and overlap each other on one side surface of the base.

10 Claims, 5 Drawing Sheets

COMB STYLE CONNECTOR AND CONNECTING ASSEMBLY WITH THE SAME

BRIEF DESCRIPTION OF THE DRAWINGS

FIGS. 2 and 3 are cross-sectional views of an exemplary connector assembly including an exemplary comb type connector according to an aspect of the disclosure and an exemplary comb type connector according to another aspect of the disclosure, wherein FIG. 2 is a view illustrating a state in which a pair of exemplary comb type connectors are spaced apart from each other, and FIG. 3 is a view illustrating a state in which a pair of exemplary comb type connectors are coupled to each other.

FIGS. 4 and 5 are cross-sectional views of an exemplary connector assembly including a comb type connector according to an aspect of the disclosure and a comb type connector according to another aspect of the disclosure, wherein FIG. 4 is a view illustrating a state in which a pair of exemplary comb type connectors are spaced apart from each other, and FIG. 5 is a view illustrating a state in which a pair of exemplary comb type connectors are coupled to each other.

DETAILED DESCRIPTION

Figure 1:
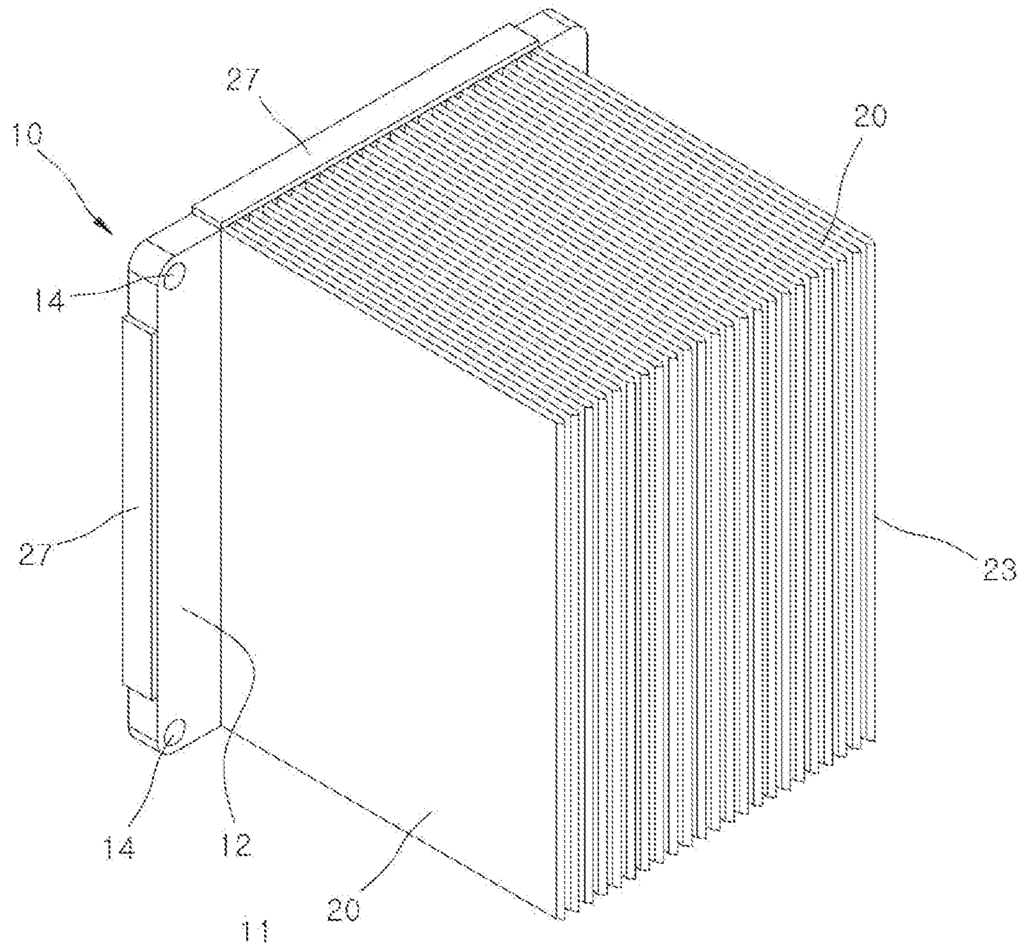
FIG. 1 is a perspective view of an exemplary comb type connector according to an aspect of the disclosure.

The disclosure relates to a connector for transmitting electrical energy, and more particularly, to a comb type connector and a connector assembly having the same.

A connector is an electronic component that electrically connects a power source to a device, a device to a device, or units inside a device to each other. The connector through which weak current such as a control signal and a detection signal flow may be designed to have a small size because it may not matter if a contact area of a terminal is small. However, the connector supplying power for driving a motor or a heater should have a sufficiently large contact area of the terminal so that a large current can flow therethrough, thus there is the problem of the increase in the size of the connector and the connector assembly and the increase in manufacturing costs.

Disclosed is a comb type connector provided with a plurality of thin plate terminals which protrude and may be spaced minute intervals from each other, and a connector assembly having the same. The comb type connector may comprise: a base made of a conductive metal material; and a plurality of thin plate terminals made of a conductive metal material and which protrude in a thin film shape and may be spaced apart from and overlap each other on one side surface of the base.

The conductive metal material may be at least one of copper (Cu), a copper alloy, aluminium (Al), and an aluminium alloy.

A thickness of each of the plurality of thin plate terminals and an interval between the plurality of thin plate terminals may be substantially the same.

A thickness of each of the plurality of thin plate terminals may be 0.2 mm to 1.0 mm.

A distal end of the thin plate terminal may be rounded or tapered.

The thin plate terminal may comprise one of a coupling hook protruding from the side surface and a coupling through-hole formed passing through the thin plate terminal in a thickness direction.

In addition, the present disclosure describes a connector assembly comprising: a first comb type connector including a first base and a plurality of first thin plate terminals which protrude in a thin plate shape and may be spaced apart from and overlap each other on one side surface of the first base; and a second comb type connector including a second base and a plurality of second thin plate terminals which protrude in a thin plate shape and may be spaced apart from and overlap each other on one side surface of the second base, wherein, when approaching the first comb type connector, the plurality of second thin plate terminals may be alternately inserted into the plurality of first thin plate terminals so as to be conductively connected to the first comb type connector.

When the plurality of second thin plate terminals are alternately inserted into the plurality of first thin plate terminals, the first thin plate terminal and the second thin plate terminal, which are adjacent to each other, may be in surface contact with each other.

A thickness of each of the plurality of thin plate terminals, an interval between the plurality of first thin plate terminals, a thickness of each of the second thin plate terminals, and an interval between the plurality of second thin plate terminals may be substantially the same.

A distal end of the first thin plate terminal and a distal end of the second thin plate terminal may be rounded or tapered.

The connector assembly may further comprise a locking unit that locks to prevent the first comb type connector and the second comb type connector from being unintentionally separated from each other when the first comb type connector and the second comb type connector may be conductively connected to each other.

The locking unit may comprise: a coupling hook protruding from a side surface of one of the first thin plate terminal and the second thin plate terminal; and a coupling through-hole formed passing through the other one of the first thin plate terminal and the second thin plate terminal in a thickness direction so that the coupling hook may be seated when the plurality of second thin plate terminals may be alternately inserted into the plurality of first thin plate terminals.

The comb type connector and the connector assembly having the same may comprise a plurality of thin plate terminals densely disposed and spaced minute intervals from each other so that the area of the terminals that may be in electrical contact with each other is very large. Therefore, the connector and the connector assembly may be designed compactly.

Since a large amount of power may be supplied through the small comb type connector, a compact electronic device comprising the connector may be easily designed and manufactured.

Terminologies used in this specification are terms used to appropriately express preferred embodiments, which may vary according to the intention of a user or operator or conventions in the field. Therefore, definitions of these terms should be made based on the content throughout the entirety of this specification.

Figure 2:
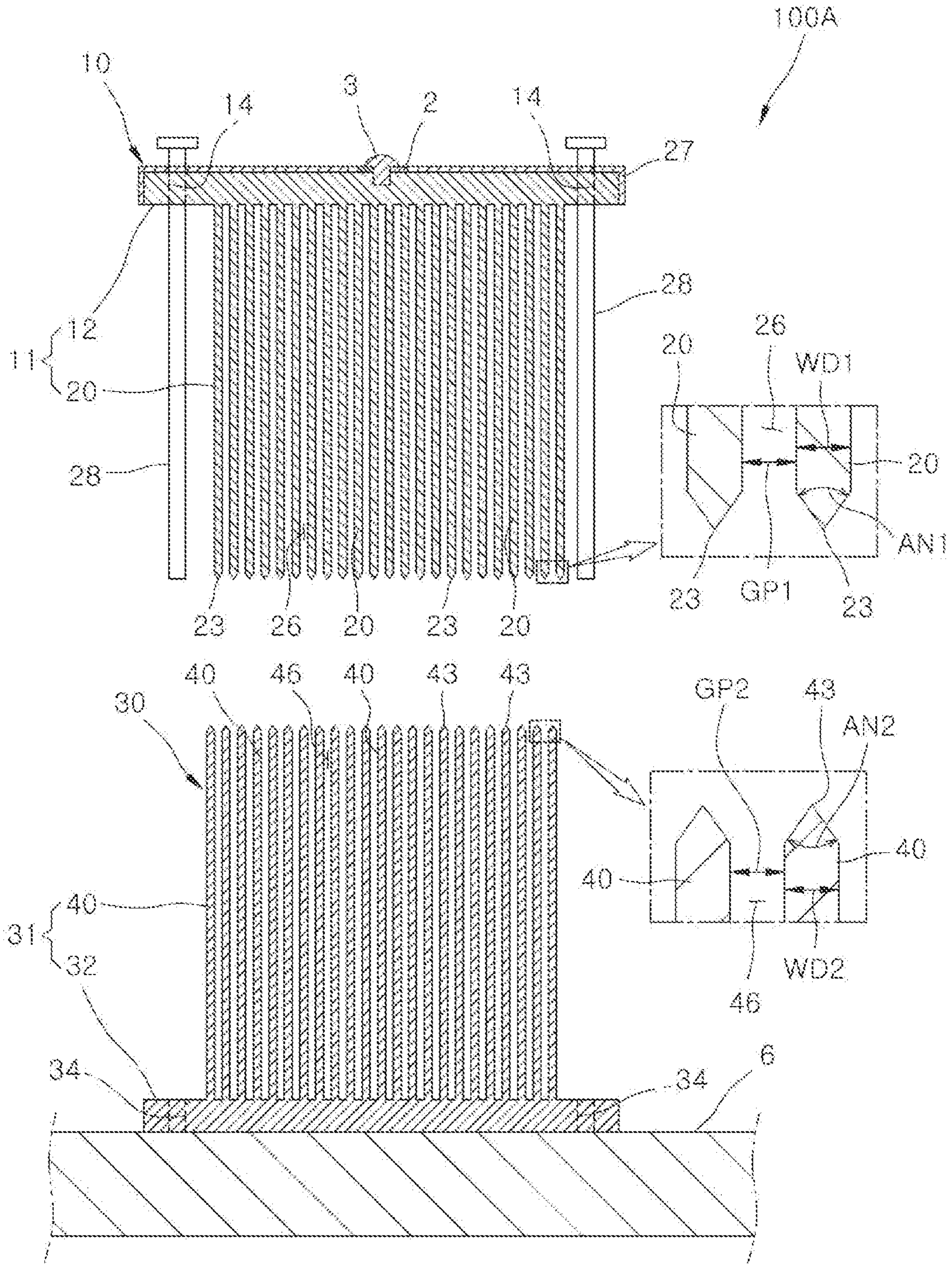
Figure 3:
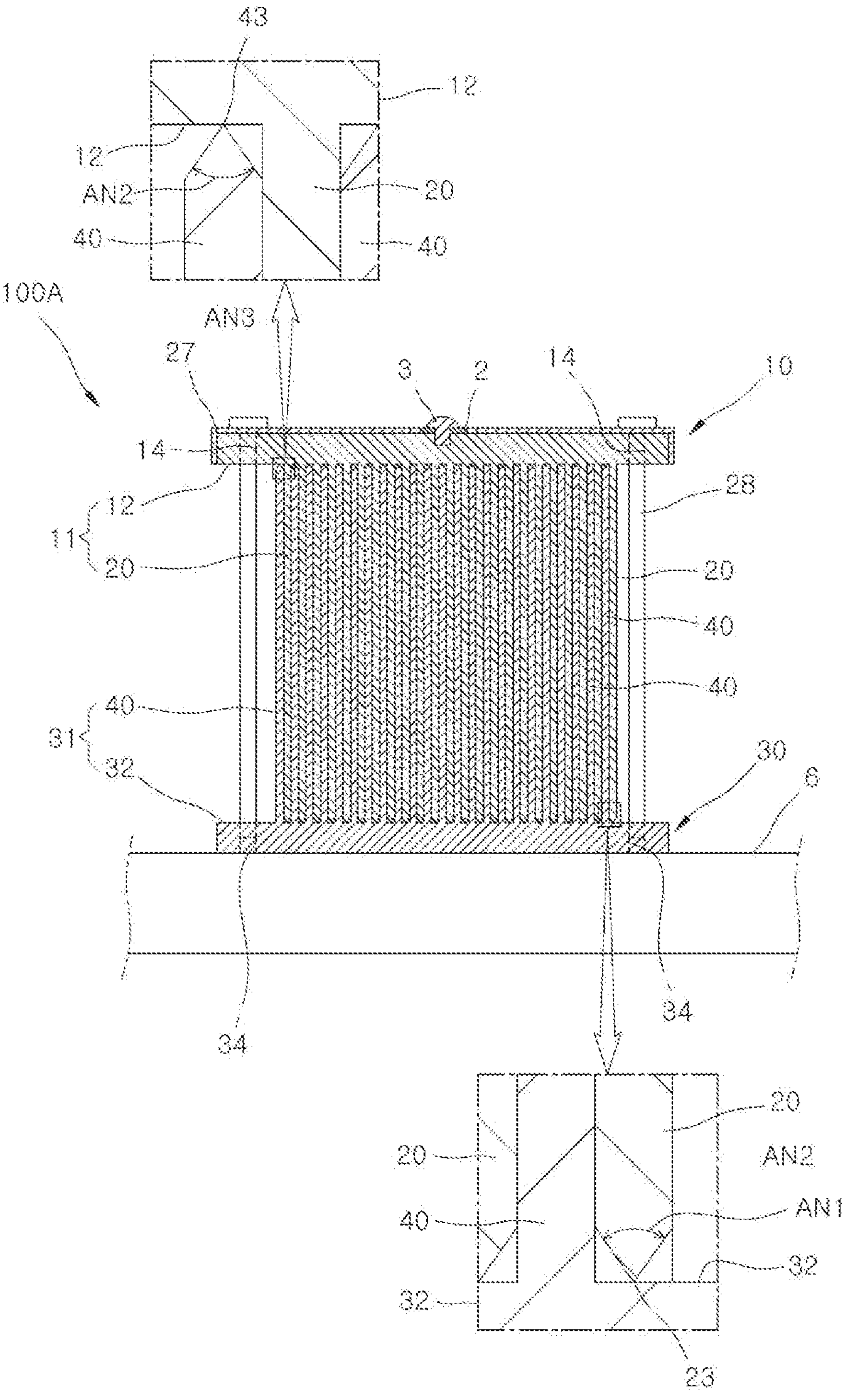

Referring to FIGS. 1 to 3 together, a connector assembly (100A) may comprise a first comb type connector (10) and a second comb type connector (30).

The first comb type connector (10) may comprise a first conductor (11) made of a conductive metal material and a non-conductor cover (27) made of a non-conductor such as, for example, plastic or rubber. The conductive metal material may be, for example, at least one of copper (Cu), a copper alloy, aluminium (Al), and an aluminium alloy. The first conductor (11) may comprise a first base (12) having substantially a plate shape and a plurality of first thin plate terminals (20) spaced apart from each other on one side surface of the first base (12) and protruding in a thin plate shape. The first conductor (11) may be manufactured by, for example, skiving a metal block made of a conductive metal material. One side surface of the first base (12) may be a side surface facing the second comb type connector (30). A direction in which the first thin plate terminal (20) protrudes may be a direction substantially orthogonal to the plate-shaped first base (12), that is, a substantially normal direction of the first base (12).

A thickness (WD1) of each of the plurality of first thin plate terminals (20) and an interval (GP1) between the plurality of first thin plate terminals (20) may be substantially the same. For example, the thickness (WD1) of each of the plurality of first thin plate terminals (20) and the interval (GP1) between the plurality of first thin plate terminals (20) may be 0.2 mm to 1.0 mm. When the thickness (WD1) of the first thin plate terminal (20) is less than 0.2 mm, the first thin plate terminal (20) has insufficient rigidity, and thus, when the first comb type connector (10) and the second comb type connector (30) may be coupled to each other, the first thin plate terminal (20) may be easily bent or damaged. Conversely, when the thickness (WD1) of the first thin plate terminal (20) is greater than 1.0 mm, it is may be difficult to miniaturize the first comb type connector (10), and the manufacturing costs of the first comb type connector (10) may also increase.

A distal end (23) of the first thin plate terminal (20) may be tapered so that a thickness thereof becomes thinner the further from the first base (12). The tapered distal end (23) of the first thin plate terminal (20) prevents connection interference between the first comb type connector (10) and the second comb type connector (30) due to the mutual blocking of the distal end of the first thin plate terminal (20) and the distal end of the second thin plate terminal (40) when the first comb type connector (10) and the second comb type connector (30) may be close to each other. For example, an angle (AN1) of the tapered distal end (23) may be an acute angle greater than 0° and less than 90°. Unlike those shown in FIGS. 2 and 3, the distal end of the first thin plate terminal (20) may be rounded.

An electric wire (not shown) is conductively connected to the first base (12). For example, an annular conductor part (2) may be formed at a distal end of the electric wire, and the annular conductor part (2) may be fixed by means of a screw (3) so as to be in close contact with the other side surface of the first base (12), i.e., a side surface opposite to the side surface from which the plurality of first thin plate terminals (20) protrude. However, the annular conductor part (2) and the screw (3) are only some examples among various means for conductively connecting the electric wire to the first base (12).

The non-conductive cover (27) may cover the other side surface and a circumferential edge surface of the first base (12). When coupling the first comb type connector (10) to the second comb type connector (30), or conversely, separating the first comb type connector (10) from the second comb type connector (30), the non-conductor cover (27) may act as a handle for the operator to hold the first comb type connector (10) in their hands. A portion of the other side surface of the first base (12), for example, a portion with which the annular conductor part (2) is in close contact and a portion through which a bolt (28) passes may be exposed without being covered by the non-conductive cover (27).

The second comb type connector (30) may comprise a second conductor (31) made of a conductive metal material. The conductive metal material may be, for example, one of copper (Cu), a copper alloy, aluminium (Al), and an aluminium alloy. The second conductor (31) may comprise a second base (32) having substantially a plate shape and a plurality of second thin plate terminals (40) spaced apart from each other on one side surface of the second base (32) and protruding in a thin plate shape. The second conductor (31) may be manufactured by, for example, skiving a metal block made of a conductive metal material. One side surface of the second base (32) may be a side surface facing the first comb type connector (10). A direction in which the second thin plate terminal (40) protrudes may be a direction substantially orthogonal to the plate-shaped second base (32), that is, a substantially normal direction of the second base (32).

The other side surface of the second base (32) may be fixedly mounted to be conductively connected to a printed circuit board (PCB) 6 of an electronic device (not shown). However, unlike those shown in FIGS. 2 and 3, the second base (32) may be conductively connected to the electric wire, like the first base (12).

A thickness (WD2) of each of the plurality of second thin plate terminals (40) and an interval (GP2) between the plurality of second thin plate terminals (40) may be substantially the same. For example, the thickness (WD2) of each of the plurality of second thin plate terminals (40) and the interval (GP2) between the plurality of second thin plate terminals (40) may be 0.2 mm to 1.0 mm. As a result, the thickness (WD1) of each of the plurality of first thin plate terminals (20), the interval (GP1) between the plurality of first thin plate terminals (20), the thickness (WD2) of each of the plurality of second thin plate terminals (40), and the intervals (GP2) between the plurality of second thin plate terminals (40) may all be 0.2 mm to 1.0 mm so as to be equal to each other.

Like the distal end (23) of the first thin plate terminal (20), the distal end (43) of the second thin plate terminal (40) may be tapered to be thinner the further from the second base (32). Like the tapered distal end (23) of the first thin plate terminal (20), the tapered distal end (43) of the second thin plate terminal (40) prevents the mutual blocking of the distal end of the first thin plate terminal (20) and the distal end of the second thin plate terminal (40) when the first comb type connector (10) and the second comb type connector (30) may be close to each other. For example, an angle (AN2) of the tapered distal end (43) may be an acute angle greater than 0° and less than 90°. Unlike those shown in FIGS. 2 and 3, the distal end of the second thin plate terminal (40) may be rounded.

As illustrated in FIG. 2, in a state in which the plurality of first thin plate terminals (20) and the plurality of second thin plate terminals (40) face each other and may be aligned to be offset by the thickness (WD1, WD2) of one of the thin plate terminals (20, 40), when the second comb type connector (30) approaches the first comb type connector (10), the distal end (23) of the plurality of first thin plate terminals (20) may be inserted into a gap (46) between the plurality of second thin plate terminals (40), and the distal end (43) of the plurality of second thin plate terminals (40) may be inserted into a gap (26) between the plurality of first thin plate terminals (20). In addition, as the second base (32) approaches the first base (12), as illustrated in FIG. 3, the plurality of second thin plate terminals (40) may be alternately inserted between the plurality of first thin plate terminals (20) so that the second comb type connector (30) may be conductively connected to the first comb type connector (10).

As described above, when the plurality of second thin plate terminals (40) are alternately inserted into the plurality of first thin plate terminals (20), the plurality of first thin plate terminals (20) and the plurality of second thin plate terminals (40), which are adjacent to each other, may be in surface contact with each other. A depth at which the plurality of first thin plate terminals (20) may be inserted into the gap (46) between the plurality of second thin plate terminals (40) may be substantially the same as a depth at which the plurality of second thin plate terminals (40) may be inserted into the gap (26) between the plurality of first thin plate terminals (20), and as the insertion depth increases, the surface contact pressure may increase so that the first comb type connector (10) and the second comb type connector (30) may be more firmly coupled to each other.

As described above, when the second comb type connector (30) approaches the first comb type connector (10) so that the plurality of second thin plate terminals (40) may be inserted into the plurality of first thin plate terminals (20), the first comb type connector (10) and the second comb type connector (30) may be electrically connected to each other, but they are not limited thereto. Even when the comb type connector (10) and the second comb type connector (30) approach each other, or the first comb type connector (10) and the second comb type connector (30) move toward each other, the first comb type connector (10) and the second comb type connector (30) may be electrically connected to each other. In other words, when the second comb type connector (30) approaches the first comb type connector (10) in a relative relationship, the second comb type connector (30) may be conductively connected to the first comb type connector (10). Conversely, when the second comb type connector (30) moves away from the first comb type connector (10), the connection between the first comb type connector (10) and the second comb type connector (30) may be broken.

The connector assembly (100A) may further comprise a locking unit that locks to prevent the first comb type connector (10) and the second comb type connector (30) from being unintentionally separated from each other when the first comb type connector (10) and the second comb type connector (30) may be conductively connected to each other. The locking unit may be provided with a plurality of bolts (28). Each of the bolts (28) may comprise a bolt body having a male screw pattern (not shown) formed on an outer circumferential surface thereof, and a bolt head formed at one end of the bolt body to have an expanded diameter. A plurality of bolt through-holes (14) through which the bolt body of each of the plurality of bolts (28) may pass, but the bolt head may not pass may be formed in the first base (12).

A plurality of bolt fastening holes (34) to which a distal end of the bolt body of the plurality of bolts (28) may be inserted and fastened may be formed in the first base (32). A female screw pattern corresponding to the male screw pattern on the outer circumferential surface of the bolt body may be formed on an inner circumferential surface of each of the bolt fastening holes (34). After the plurality of first thin plate terminals (20) and the plurality of second thin plate terminals (40) may be in alternating close contact with each other so that the first conductor (11) and the second conductor (31) are electrically connected, when the bolt bodies of the plurality of bolts (28) pass through a plurality of bolt through-holes (14) and may be fixed to the plurality of bolt fastening holes (34), the first comb type connector (10) and the second comb type connector (30) may not be separated from each other.

In the connector assembly (100A) illustrated in FIGS. 2 and 3, the number of plurality of first thin plate terminals (20) and the number of plurality of second thin plate terminals (40) may be the same, but the present disclosure is not limited thereto. The number of first thin plate terminals and the number of second thin plate terminals may be different from each other. In this case, when the first comb type connector and the second comb type connector may be electrically coupled to each other, the surplus thin plate terminals that may not be in surface contact with the thin plate terminals of the opposing side may function as heat dissipation fins that dissipate heat of the connector assembly (100A). As a result, overheating of the first comb type connector (10) and the second comb type connector (30) may be prevented to reduce a resistance value, thereby improving current and power transmission efficiency through the connector assembly (100A).

The comb type connectors (10, 30) described above and the connector assembly (100A) having the same may comprise the plurality of thin plate terminals (20, 40) spaced minute intervals from each other and densely arranged, and thus, the area of the terminals that may be in electrical contact with each other may significantly increase. Therefore, the connectors (10, 30) and the connector assembly (100A) may be designed compactly. In addition, since a large amount of power may be supplied with the small comb type connectors (10, 30), a compact electronic device including the connectors (10, 30) may be easily designed and manufactured.

Figure 4:
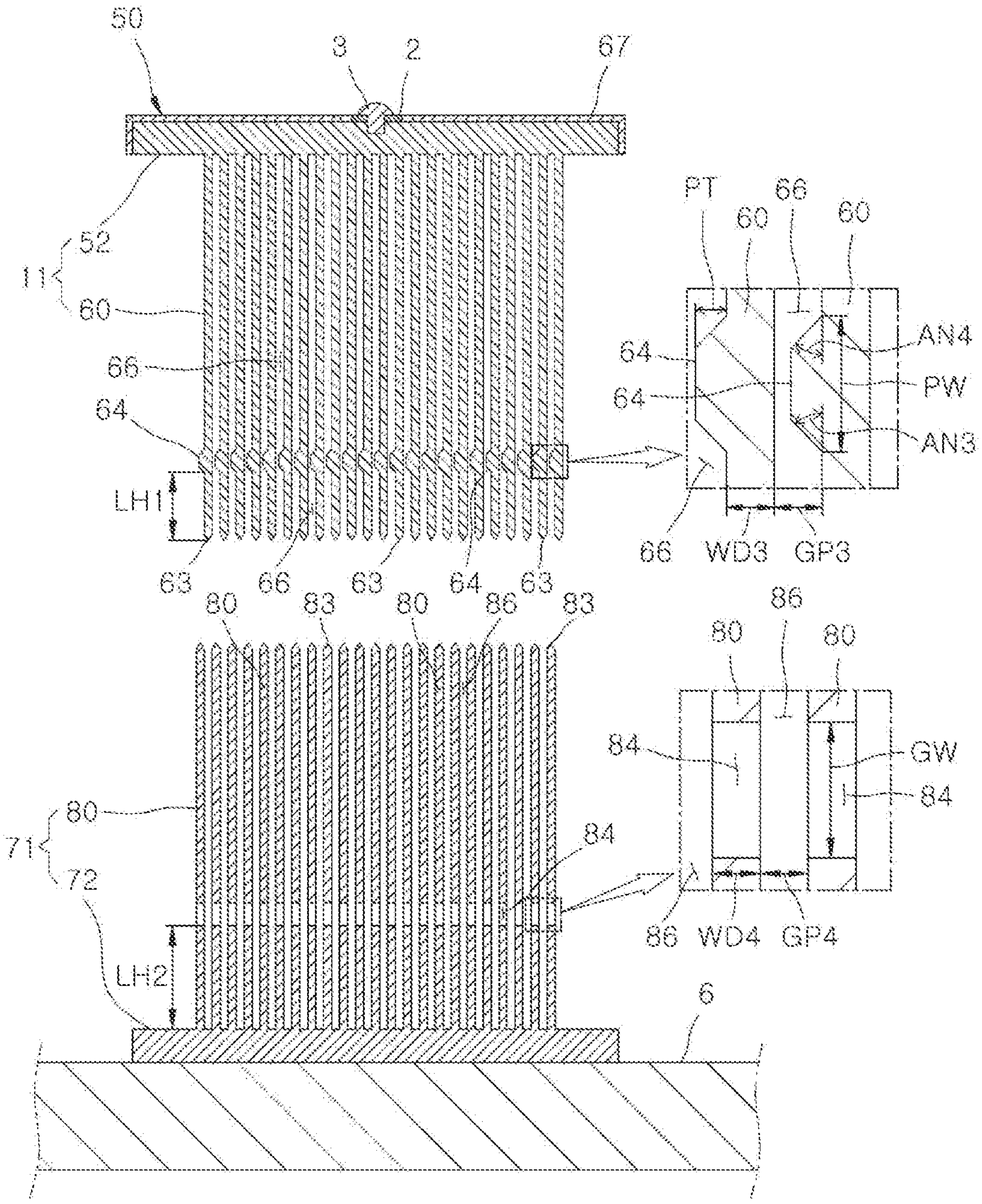
Figure 5:
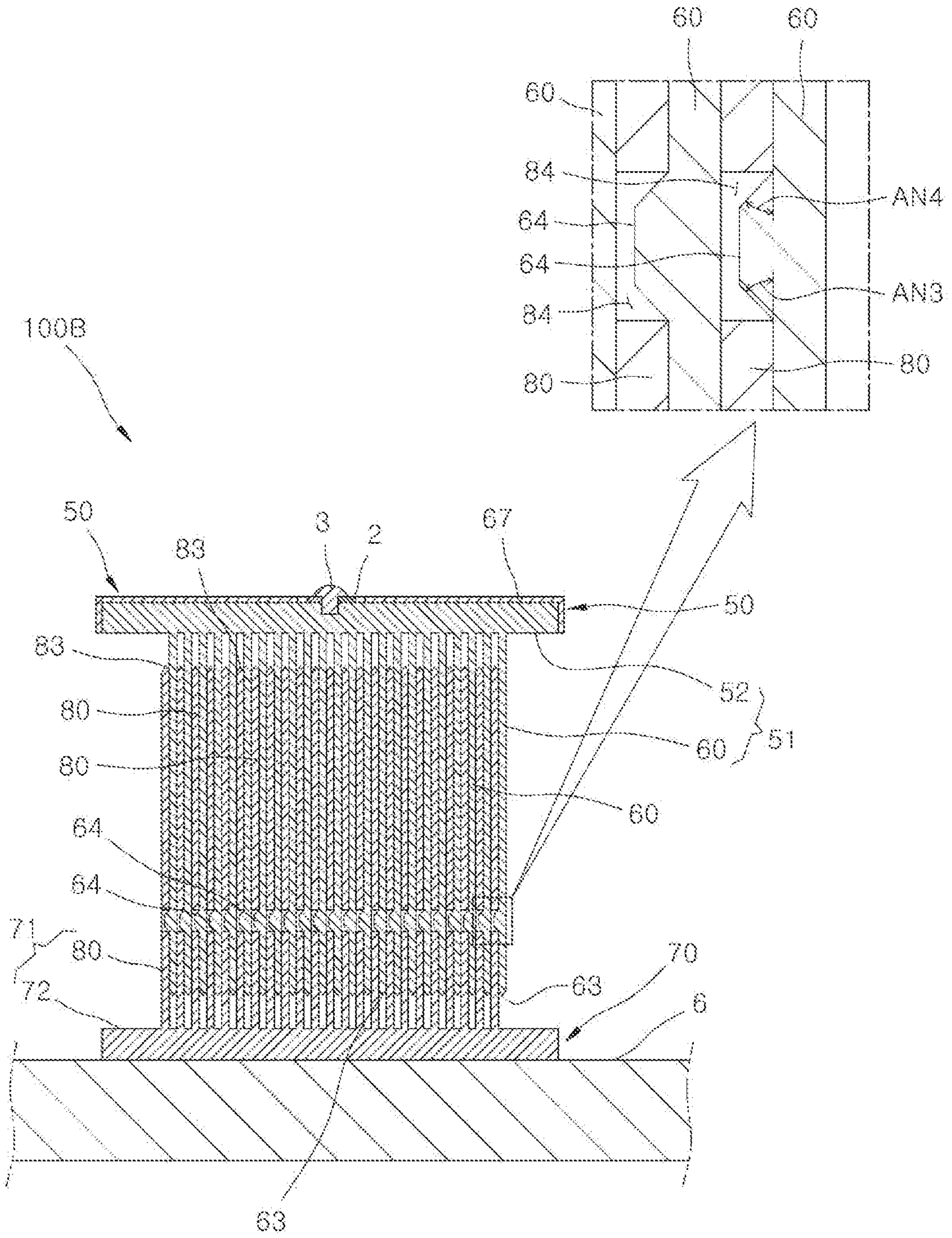

Referring to FIGS. 4 and 5 together, a connector assembly (100B) may comprise a first comb type connector (50) and a second comb type connector (70).

The first comb type connector (50) may comprise a first conductor (51) made of a conductive metal material and a non-conductor cover (67). Since the material of the non-conductor cover (67) made of the conductive metal material is the same as that of the connector assembly (100A) described with reference to FIGS. 1 to 3, duplicated description will be omitted. The first conductor (51) may comprise a first base (52) having substantially a plate shape and a plurality of first thin plate terminals (60) spaced apart from each other on one side surface of the first base (52) and protruding in a thin plate shape. The first conductor (51) may be manufactured by, for example, skiving a metal block made of a conductive metal material.

A thickness (WD3) of each of the plurality of first thin plate terminals (60) and an interval (GP3) between the plurality of first thin plate terminals (60) may be substantially the same and may be 0.2 mm to 1.0 mm. A distal end (63) of the first thin plate terminal (60) may be tapered or rounded so that the thickness becomes thinner the further from the first base (52). An electric wire (not shown) may be conductively connected to the first base (52). For example, an annular conductor part (2) may be formed at a distal end of an electric wire, and the annular conductor part (2) may be fixed by means of a screw (3) so as to be in close contact with the other side surface of the first base (52), i.e., a side surface opposite to the side surface from which the plurality of first thin plate terminals (60) may protrude.

The non-conductive cover (67) may cover the other side surface and a circumferential edge surface of the first base (52). When coupling the first comb type connector (50) to the second comb type connector (70), or conversely, separating the first comb type connector (50) from the second comb type connector (70), the non-conductor cover (67) may act as a handle for the operator to hold the first comb type connector (50) in their hands.

The second comb type connector (70) may comprise a second conductor (71) made of a conductive metal material. The second conductor (71) may comprise a second base (72) having substantially a plate shape and a plurality of second thin plate terminals (80) spaced apart from each other on one side surface of the second base (72) and protruding in a thin plate shape. The other side surface of the second base (72) may be fixedly mounted to be conductively connected to a PCB (6) of an electronic device (not shown). However, unlike those shown in FIGS. 4 and 5, the second base (72) may be electrically connected to the electric wire, like the first base (52).

A thickness (WD4) of each of the plurality of second thin plate terminals (80) and an interval (GP4) between the plurality of second thin plate terminals (80) may be substantially the same and may be 0.2 mm to 1.0 mm. As a result, the thickness (WD3) of each of the plurality of first thin plate terminals (60), the interval (GP3) between the plurality of first thin plate terminals (60), the thickness (WD4) of each of the plurality of second thin plate terminals (80), and the intervals (GP4) between the plurality of second thin plate terminals (80) may all be 0.2 mm to 1.0 mm so as to be equal to each other. Like the distal end (63) of the first thin plate terminal (60), the distal end (83) of the second thin plate terminal (80) may be tapered or rounded so that the thickness becomes thinner the further from the second base (72).

As illustrated in FIG. 4, in a state in which the plurality of first thin plate terminals (60) and the plurality of second thin plate terminals (80) face each other and may be aligned to be offset by the thickness (WD3, WD4) of one of the thin plate terminals (60, 80), when the second comb type connector (70) approaches relative to the first comb type connector (50), the distal end (63) of the plurality of first thin plate terminals (60) may be inserted into a gap (86) between the plurality of second thin plate terminals (80), and the distal end (83) of the plurality of second thin plate terminals (80) may be inserted into a gap (66) between the plurality of first thin plate terminals (60). In addition, as the second base (72) approaches the first base (52), as illustrated in FIG. 5, the plurality of second thin plate terminals (80) may be alternately inserted into the plurality of first thin plate terminals (60) so that the second comb type connector (70) may be conductively connected to the first comb type connector (50). Conversely, when the second comb type connector (70) is relatively far away from the first comb type connector (50) so that the second comb type connector (70) and the first comb type connector (50) may be spaced apart from each other, the connection between the first comb type connector (50) and the second comb type connector (70) may be broken.

The connector assembly (100B) may further comprise a locking unit that locks to prevent the first comb type connector (50) and the second comb type connector (70) from being unintentionally separated from each other when the first comb type connector (50) and the second comb type connector (70) may be conductively connected to each other. The locking unit may be provided with a plurality of coupling hooks (64) and a plurality of coupling through-holes (84). The plurality of coupling hooks (64) may protrude from a side surface of each of the first thin plate terminals (60) in a direction in which the thickness of the first thin plate terminal (60) partially increases. The plurality of coupling through-holes (84) may be formed to pass through the second thin plate terminals (80) in the thickness direction, respectively.

When the plurality of second thin plate terminals (80) are alternately inserted into the plurality of first thin plate terminals (60), sizes and positions of the coupling hooks (64) and the coupling through-holes (84) may be determined so that the plurality of coupling hooks (64) may be inserted one by one into and seated in the plurality of coupling through-holes (84). To elaborate, a length (PW) of the coupling hook (64) in a direction substantially parallel to the protruding direction of the first thin plate terminal (60) may be equal to or slightly less than a length (GW) of the coupling through-hole (84) in a direction substantially parallel to the protruding direction of the second thin plate terminal (80). A depth of the coupling through-hole (84) may be substantially the same as a thickness (WD4) of the second thin plate terminal (80). A thickness (PT) of the coupling hook (64) may be less than the depth (WD4) of the coupling through-hole (84). A width (not shown) of the coupling hook (64), which may be substantially orthogonal to the length (PW) and thickness (PT) of the coupling hook (64) may be equal to or slightly less than a width (not shown) of the coupling through-hole (84), which may be substantially orthogonal to the length (GW) and depth (WD4) of the coupling through-hole (84).

A distance (LH1) from the distal end (63) of the first thin plate terminal (60) to the coupling hook (64) may be less than or equal to a distance (LH2) from a boundary point between the second base (72) and the second thin plate terminal (80) to the coupling through-hole (84). When the distance (LH1) from the distal end (63) of the first thin plate terminal (60) to the coupling hook (64) is greater than the distance (LH2) from the boundary point between the second base (72) and the second thin plate terminal (80) to the coupling through-hole (84), the coupling hook (64) may be seated in the coupling through-hole (84).

The plurality of first thin plate terminals (60) and the plurality of second thin plate terminals (80) may cross each other and may be inserted into the gaps (66, 86) of the opposing comb connectors (50, 70), and when the plurality of coupling hooks (64) are inserted into and seated in the plurality of coupling through-holes (84), the first comb type connector (50) and the second comb type connector (70) may be stably coupled to each other and may not be unintentionally separated from each other by external force or vibrations.

The coupling hook (64) may protrude from a side surface of the second thin plate terminal (60) so that a cross-sectional shape thereof may have a trapezoidal shape. An inclination angle (AN3) of an inclined surface of a front end of the coupling hook (64) in the protruding direction of the first thin plate terminal (60) may be an acute angle greater than 0° and less than 90°. When the inclination angle (AN3) is greater than 90°, the plurality of first thin plate terminals (60) and the plurality of second thin plate terminals (80) may cross each other, and when being inserted into the gaps (66, 86) between the opposing comb type connectors (50, 70), the front end of the coupling hook (64) may be hooked on the distal end (83) of the second thin plate terminal (80) and may not be inserted any more. If the inclination angle (AN3) is less than 0°, the protruding coupling hook (64) may not be formed.

An inclination angle (AN4) of an inclined surface of a rear end of the coupling hook (64) in the protruding direction of the first thin plate terminal (60) may be an acute angle greater than 0° and less than 90°. When the inclination angle (AN4) is greater than 90°, when the first comb type connector (50) and the second comb type connector (70) are coupled to each other and the first comb type connector (50) and the second comb type connector (70) may be pulled away from each other, the rear end of the coupling hook (64) may be hooked on an inner surface of the rear end that defines the length (GW) of the coupling through-hole (84) so that the first thin plate terminal (60) and the second thin plate terminal (80) may not be separated from each other. If the inclination angle (AN4) is less than 0°, the protruding coupling hook (64) may not be formed.

As illustrated in FIGS. 4 and 5, the coupling hook (64) may be provided in the first comb type connector (50), and the coupling through-hole (84) may be provided in the second comb type connector (70), but the present disclosure is not limited thereto, and on the contrary, the coupling hook may be provided in the second comb type connector (70), and the coupling through-hole may be provided in the first comb type connector (50).

The present disclosure has been described with reference to aspects illustrated in the drawings, but this is only exemplary, and those skilled in the art will understand that various modifications and other equivalent embodiments are possible.

The invention claimed is:

1. A comb type connector comprising:

a base made of a conductive metal material; and a plurality of thin plate terminals made of a conductive metal material and which protrude as plates from the base and are spaced apart from and overlap each other on one side surface of the base; and wherein at least one of the thin plate terminals includes a coupling hook protruding from a side surface of the plate.

2. The comb type connector of claim 1, wherein the conductive metal material comprises at least one of copper (Cu), a copper alloy, aluminium (Al), and an aluminium alloy.

3. The comb type connector of claim 1, wherein a distal end of the thin plate terminal is rounded or tapered.

4. The comb type connector of claim 1, wherein a thickness of each of the plurality of thin plate terminals and an interval between the plurality of thin plate terminals are substantially the same.

5. The comb type connector of claim 4, wherein the thickness of each of the plurality of thin plate terminals is 0.2 mm to 1.0 mm.

6. A connector assembly comprising:

a first comb type connector comprising a first base and a plurality of first thin plate terminals which protrude from the first base and are spaced apart from and overlap each other on one side surface of the first base;

a second comb type connector comprising a second base and a plurality of second thin plate terminals which protrude from the second base and are spaced apart from and overlap each other on one side surface of the second base, wherein, when approaching the first comb type connector, the plurality of second thin plate terminals are alternately inserted into the plurality of first thin plate terminals so as to be conductively connected to the first comb type connector; and a locking unit that locks to prevent the first comb type connector and the second comb type connector from being unintentionally separated from each other when the first comb type connector and the second comb type connector are conductively connected to each other, the locking unit including a coupling hook protruding from a side surface of one of the first thin plate terminal and the second thin plate terminal, and a coupling through-hole formed by passing through the other one of the first thin plate terminal and the second thin plate terminal in a thickness direction so that the coupling hook is seated when the plurality of second thin plate terminals are alternately inserted into the plurality of first thin plate terminals.

7. The connector assembly of claim 6, wherein when the plurality of second thin plate terminals are alternately inserted into the plurality of first thin plate terminals, the first thin plate terminal and the second thin plate terminal, which are adjacent to each other, are in surface contact with each other.

8. The connector assembly of claim 6, wherein a thickness of each of the plurality of thin plate terminals, an interval between the plurality of first thin plate terminals, a thickness of each of the second thin plate terminals, and an interval between the plurality of second thin plate terminals are substantially the same.

9. The connector assembly of claim 6, wherein a distal end of the first thin plate terminal and a distal end of the second thin plate terminal are rounded or tapered.

10. A comb type connector comprising:

a base made of a conductive metal material; and a plurality of thin plate terminals made of a conductive metal material and which protrude as plates from the base and are spaced apart from and overlap each other on one side surface of the base; and wherein the thickness of each of the plurality of thin plate terminals is 0.2 mm to 1.0 mm.

* * * * *